United States Patent
Pala et al.

(10) Patent No.: US 6,304,173 B2
(45) Date of Patent: *Oct. 16, 2001

(54) REAR VIEW AND MULTI-MEDIA SYSTEM FOR VEHICLES

(75) Inventors: Silviu Pala, Birmingham; Phil LeMay, Ann Arbor; Scott Shields, White Lake; Terence Duncan, Farmington Hills; Michael Maass, Ypsilanti; Joseph Stevens, Wyandotte; John McConnell; Jerome Ng, both of Ann Arbor; Ozer M. N. Teitelbaum, Farmington Hills, all of MI (US)

(73) Assignee: Lear Automotive Dearborn Inc, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,687

(22) Filed: Jan. 29, 1999

(51) Int. Cl.[7] .................................................. G09F 9/00
(52) U.S. Cl. .......................... 340/461; 340/903; 340/937; 348/118; 348/148
(58) Field of Search ..................... 340/461, 436, 340/435, 937, 426, 901, 903; 348/148, 149, 113, 118; 367/108

(56) References Cited

U.S. PATENT DOCUMENTS

| | | | |
|---|---|---|---|
| 4,679,158 | 7/1987 | Tate | 364/559 |
| 4,854,538 | * 8/1989 | Von Schalscha | 248/346 |
| 4,908,611 | * 3/1990 | Iino | 340/980 |
| 4,962,998 | 10/1990 | Iino | 350/174 |
| 5,027,104 | * 6/1991 | Reid | 340/937 |
| 5,056,905 | 10/1991 | Jensen | 359/843 |
| 5,059,956 | 10/1991 | Iino | 340/705 |
| 5,289,321 | * 2/1994 | Secor | 354/81 |
| 5,306,953 | 4/1994 | Weiner | 307/10.1 |
| 5,530,421 | * 6/1996 | Marshall et al. | 340/436 |
| 5,668,675 | 9/1997 | Fredricks | 359/843 |
| 5,670,935 | * 9/1997 | Schofield et al. | 340/903 |
| 5,684,647 | 11/1997 | Rouleau | 359/843 |
| 5,708,857 | 1/1998 | Ishibashi | 396/21 |
| 5,719,713 | 2/1998 | Brown | 359/843 |
| 5,745,310 | 4/1998 | Mathieu | 359/843 |
| 5,793,308 | * 8/1998 | Rosinski et al. | 340/903 |
| 5,823,599 | * 10/1998 | Gray | 224/929 |

FOREIGN PATENT DOCUMENTS

| | | |
|---|---|---|
| 42 13 129 A 1 | 10/1993 | (DE) . |
| 62122844 A | 6/1987 | (JP) . |
| 62166135 A | 7/1987 | (JP) . |
| 03118251 A | 5/1991 | (JP) . |
| 04063739 A | 2/1992 | (JP) . |
| 08265611 A | 10/1996 | (JP) . |
| 09142210 A | 6/1997 | (JP) . |
| 11129815 A | 5/1999 | (JP) . |

* cited by examiner

Primary Examiner—Brent A. Swarthout
(74) Attorney, Agent, or Firm—Timothy J. Haller; Niro, Scavone, Haller, Niro

(57) ABSTRACT

A vehicle display system includes a display which is selectively movable between a first position in which it is viewable by a driver and a second position in which it is viewable by the rear passengers but not the driver. In the first position, the display provides a rear view from a camera mounted at the rear of the vehicle. In the second position, the display provides entertainment to the passengers in the rear seats.

36 Claims, 3 Drawing Sheets

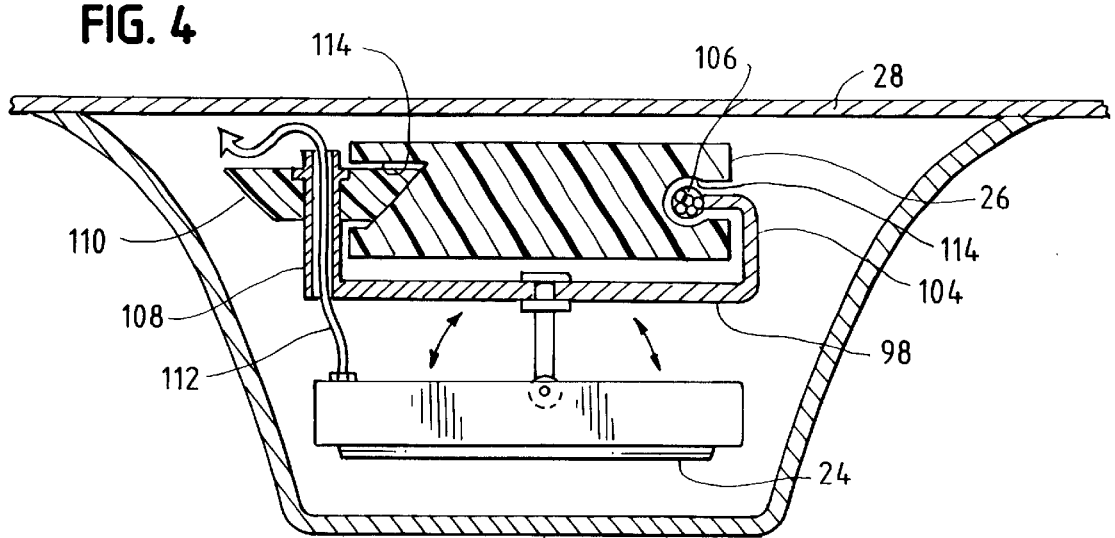
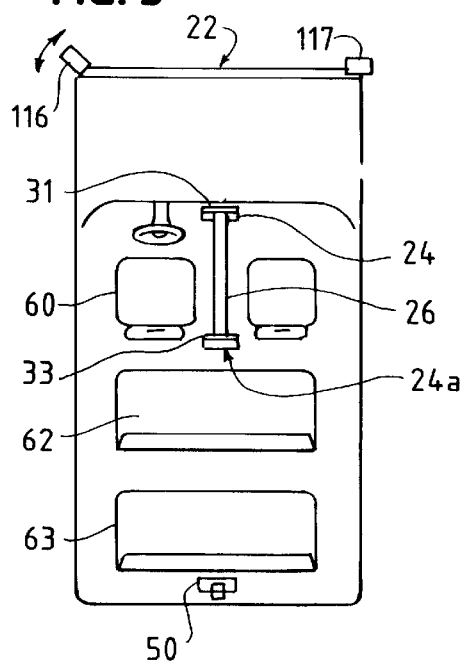
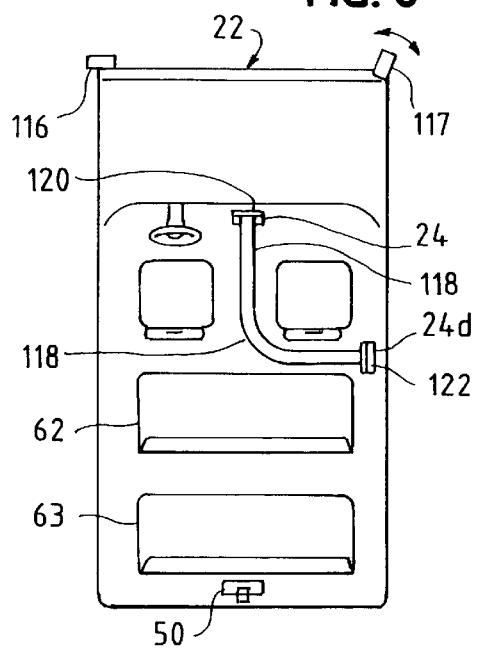
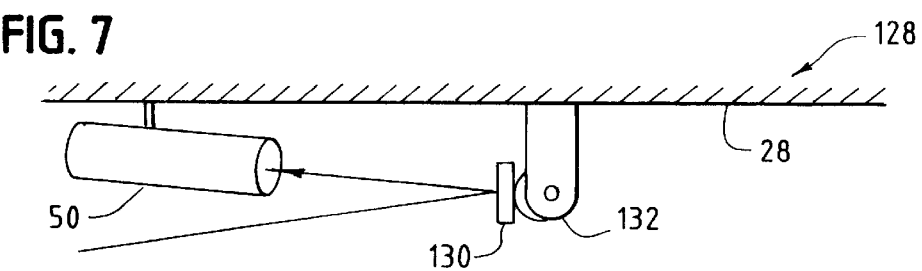

REAR VIEW AND MULTI-MEDIA SYSTEM FOR VEHICLES

BACKGROUND OF THE INVENTION

The present invention relates to display systems for vehicles and more particularly to a rear view and multi-media system for a vehicle.

The standard rear view mirrors for vehicles are sometimes insufficient for larger vehicles such as minivans and sport utility vehicles, particularly when the vehicle is backing up. The current popularity of minivans and sport utility vehicles has made this need for improved rear view systems more prominent.

Some vehicle manufacturers are beginning to provide entertainment for passengers in the rear seats. A flat panel display is installed in the headliner or on the back of the front seats. The display is typically mounted in a position such that it is not viewable by the driver, in order to prevent distraction of the driver.

SUMMARY OF THE INVENTION

The present invention provides a vehicle display system which provides entertainment for the passengers in the rear seats and an improved rear view to the driver. The vehicle display system may also provide other camera views to the driver such as front or side views. The vehicle display system includes a display which is selectively movable between a first position in which it is viewable by the driver and a second position in which it is viewable by the passengers in the rear seats, but not the driver.

While in the first position, the system provides a rear view to the driver. This rear view is provided by a camera mounted at the rear of the vehicle. This camera selectively provides one of several rear views. First, the rear view may provide a distant rear view, which is similar to a rear view mirror view. Second, the rear view camera may provide a near or adjacent rear view of the area immediately adjacent and behind the vehicle. Third, the camera selectively provides a rear view of the interior of the vehicle, such that the driver can monitor children in the rear seats. The display may also provide navigation instructions or other information regarding the vehicle to the driver while in the first position.

When the display is in the second position, viewable by the passengers in the rear seats, the display provides entertainment, such as a video signal from a video game, movie player, television, AutoPC or multi-media presentations, etc.

BRIEF DESCRIPTION OF THE DRAWINGS

FIG. 4 is a sectional view taken along line 4—4 of FIG. 3;

FIG. 5 is a plan view of the vehicle display system of FIG. 1;

FIG. 6 is a plan view, similar to FIG. 5, of an alternate display system;

FIG. 7 illustrates an alternate camera system which can be used in the vehicle display system of FIG. 1;

DETAILED DESCRIPTION OF THE PREFERRED EMBODIMENT

Figure 1:
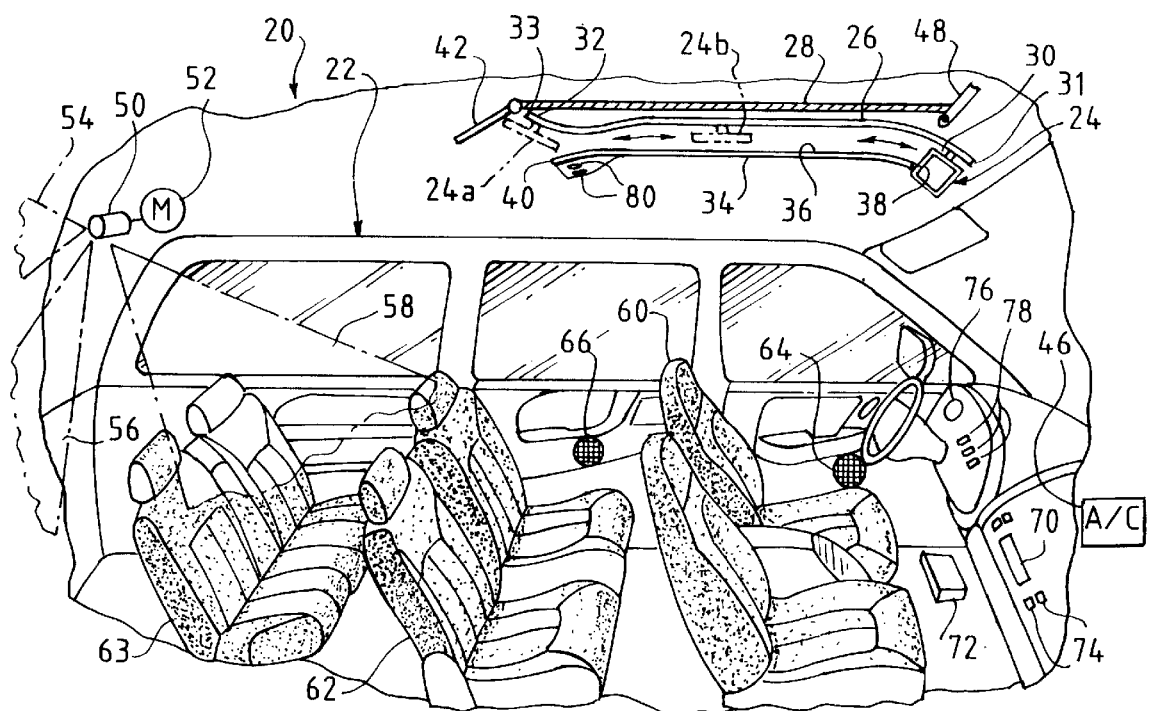
FIG. 1 illustrates the vehicle display system of the present invention installed in a vehicle.

A vehicle display system 20 according to the present invention is shown in FIG. 1 installed in a vehicle 22. The vehicle display system 20 includes a display 24, preferably a flat panel display, such as an electroluminescent display, LCD, OLED, FED or other known flat panel displays. The display 24 is movably mounted on a rail 26 which in turn is secured to the roof or headliner 28 of the vehicle 22. The rail 26 includes a downwardly turned portion 30 at a forward end 31 and an upwardly turned portion 32 at a rear end 33 of the rail 26. The display 24 is movable along the rail 26 between a forward first position at the forward end 31 of the rail 26 and a rearward second position 24a at the rear end 33 of the rail 26. In FIG. 1, the display 24 is illustrated at the first position, while reference numeral 24a indicates the display 24 at the second position and reference numeral 24b indicates the display 24 in a stored position or in movement between the first and second positions.

The rail 26 is at least partially enclosed by a housing 34 which may comprise or be similar to the headliner 28. The housing 34 defines a tunnel 36 between the first and second positions of the display 24. The tunnel 36 includes a forward first opening 38 adjacent the first position of the display 24 and a second opening 40 adjacent the second position of the display 24a. A door 42 preferably at least partially covers the second opening 40 when the display 24 is not in the second position. The door 42 may be spring biased to the closed position or automatically electrically activated to open and close at appropriate times. The door 42 may optionally include an electric or mechanical interlock which prevents access to the tunnel 24 by passengers in the rear seat and discourages theft when the vehicle is parked. Optionally, there may be a similar or identical door closing the first end 38 of the tunnel 36.

The tunnel 36 defined by the housing 34 may also supply the HVAC to the rear of the vehicle 22. The vehicle 22 includes a climate control system including an air conditioner 46 supplying cooled air to the vehicle 22 via supply ducts, including at least one supply duct 48 which supplies some of the cooled air into the housing 34. The cooled air travels through the 36 and supplies cooled air to the passengers in the rear seats 62, 63. The cooled air also assists in keeping the display 24 cool while it is in the first position 24, second position 24a or stored or traveling in the tunnel 36. Heated air or vent air could also be supplied through the tunnel 36 of the housing 34.

The vehicle display system 20 further includes a rear camera 50, preferably mounted inside the vehicle to a motor 52 which selectively rotates the camera 50 to different angles to obtain a distant view 54, a near view 56 or an interior view 58. The distant view 54 is preferably similar to that normally obtained with a rear view mirror. The near view 56 preferably provides an image of the immediate six to ten feet rearward of the vehicle 22. The interior view 58 provides a view of the rearward portion of the interior of the vehicle 22. The camera 50 is preferably a CCD or CMOS camera. The camera 50 could be a visible light camera or infrared.

When installed in the vehicle 22, the display 24 is positioned forwardly of the driver's seat 60 and visible from the driver position in the driver's seat 60. When the display 24a is in the second position, the display 24 is viewable by passengers in the rear seats 62, 63, but not visible from the driver's seat 60. The vehicle 22 further includes front speakers 64 (one shown) generally near the driver's seat 60 (and front passenger seat) and rear speakers 66 (one shown) adjacent the rear seats 62 and/or 63.

The vehicle display system 20 further includes a movie player 70, such as a VCR, DVD or other player of prerecorded video signals prestored onto removable media 72. Although the movie player 70 is shown installed in the vehicle 22 for access by the front seat passenger, the movie player 70 could be installed in the rear seats, center console, overhead console, or could be provided to the vehicle display system 20 via auxiliary input 74.

The vehicle display system 20 further includes a second display 76 installed for viewing by the driver, such as in the instrument panel or dashboard. User input controls 78, 80 for operation of the display system 20 are provided for the front and rear seat passengers, respectively.

Figure 2:
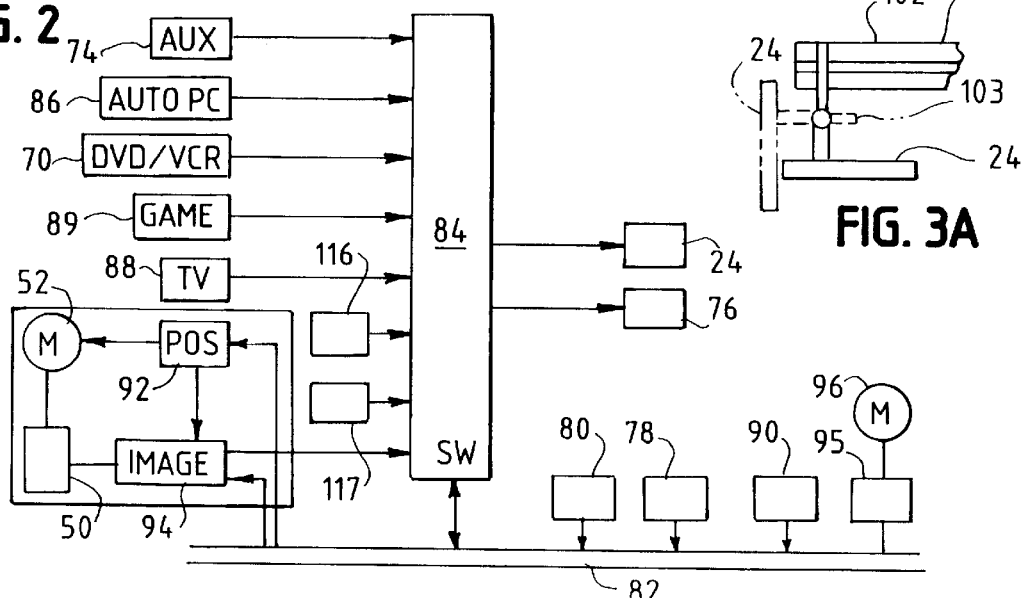
FIG. 2 is a schematic of the system of FIG. 1.

One possible schematic for implementing the vehicle display system of FIG. 1 is shown in FIG. 2. The front and rear controls 78, 80 both send signals along a control bus 82 to a video switcher 84 which selectively routes video signals to the display 24 and display 76. The movie player 70 and auxiliary input 74 are inputs to the video switcher 84. An auto PC 86, TV tuner/antenna 88 and video game 89 may also provide video signals to the switcher 84. The camera 50 is part of a rear camera system 91 and is moved by the motor 52 which is controlled by a position control circuitry 92. The video signal from the camera 50 is routed through an image processor 94 for brightness adjustment, contrast adjustment/enhancement, gamma correction or other image processing, prior to the video signal being sent to the video switcher 84. The video switcher 84 also receives, via bus 82, a gear input 90 indicating what gear the vehicle 22 is currently in, particularly whether the vehicle 22 is in reverse. Position control circuitry 95 and motor 96 control the movement of the display 24 between the first and second positions and switches the display 24 off when the display 24 is in between. Side and forward camera systems 116, 117 are preferably identical to the read camera system include motor, position control and image processor. The video switcher 84 also selects among video signals from camera systems 116, 117.

Figure 3A:
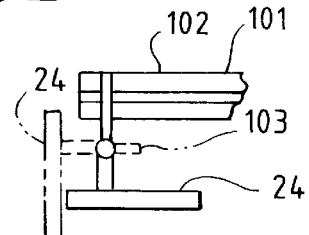
FIG. 3a illustrates an alternate configuration for the rear end of the rail of FIG. 3.
Figure 3:
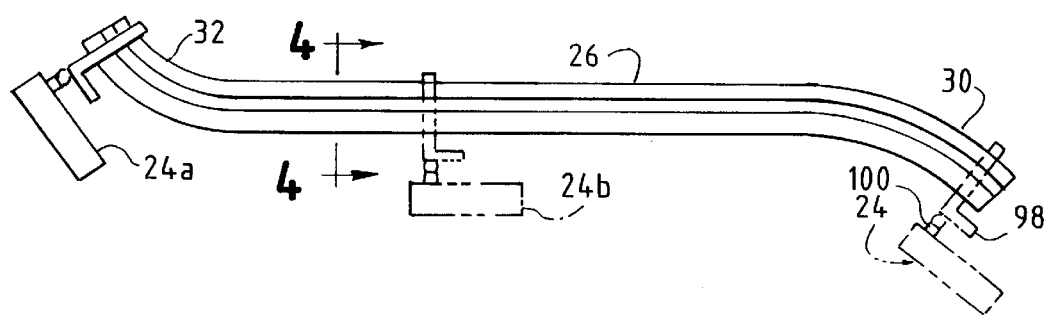
FIG. 3 is a more detailed view of the rail and display of FIG. 1.

FIG. 3 illustrates the movement of the display 24 along the rail 26 from its forward, first position at display 24, to its rearward, second position shown as display 24a. When the display 24 is in the first position adjacent the forward end 31 of the rail 26, the downwardly turned portion 30 of the rail 26 rotates the display 24 to be visible by the driver. The display 24 may be selectively manually (or via a motor) pivotable away from the driver to be visible to the front seat passenger but not the driver. A switch could enable entertainment video to the display 24 upon sensing that the display 24 has been turned away from the driver. When the display 24a is in the second position at the rear end 33 of the rail 26, the upwardly turned portion 32 of the rail 36 rotates the display 24 to be visible to the rear seat passengers, but not to the driver. In between the first and second position, the display is generally parallel to the rail 26 and switched off. The display 24 is mounted to a bracket 98 by a joint 100, such as a hinge or ball joint with sufficient friction to be selectively positionable by the users.

FIG. 3a illustrates an alternate rail 101 having a horizontal rear end 102. The display 24 is automatically tilted at the rear end 102 by a motor 103. Alternatively, the display 24 could be tiltable manually.

FIG. 4 illustrates a sectional view of the rail 26 and display 24. The display 24 is mounted to the bracket 98 which is mounted to an arm 104 secured to a drive cable 106. The bracket 98 is also secured to a hollow arm 108 which forms an axle of a wheel 110. A video cable 112 supplying video signals to the display 24 is routed through the hollow arm 108. A flexible cable for power, data, switching, etc. would also be routed through the hollow arm 108. A channel 114 is formed on either side of the rail 26. The drive cable 106 is disposed in one of the channels 114, while the wheel 110 is disposed in the other. The drive cable 106 is driven by the motor 96 (FIG. 2) to move the display 24, bracket 98, arm 104 and wheel 110 along the rail 26.

FIG. 5 illustrates a plan view of the rail 26 in the vehicle 22. As can be seen in FIG. 5, the display 24 in the first position at the forward end 31 of the rail 26 is forward of the driver's seat 60 and would thus be viewable by the driver. The display 24a in the second position at the rear end 33 of the rail 26 is positioned rearward of the first position and, preferably, rearward of the driver seat 60. Alternatively, the second position of the display 24a could be adjacent the driver's seat 60, although preferably sufficiently rearward to avoid or discourage viewing by the driver. As can be seen, the display 24 in the first position is generally parallel to the display 24a in the second position. As can also be seen in FIG. 5, side and forward view cameras 116, 117 could be mounted at the front of the vehicle 22. These cameras 116, 117 could be CCD, CMOS, infrared, etc. The cameras 116, 117 are pivotable about a vertical axis via a user-controlled motor (not shown) to vary between a side view and forward view.

The operation of the vehicle display system 20 will be described with respect to FIGS. 1 and 2. When the display 24 is in the first position, viewable from the driver seat 60, video switcher 84 sends the video signal selectively from the cameras 50, 116, or 117 to the display 24. If the display 24 is pivoted away from the driver in the first position, entertainment video may also be sent to the display 24. The initial position of the cameras 50, 116, 117 and the default or initial view provided to the display 24 when in the first position may be user-definable through software. The positioning circuitry 92 controls the motor 52 to angle the camera 50 to provide the distant view 54. When the gear input 90 indicates that the vehicle 22 is switched into reverse, the positioning circuitry 92 changes the angle of the camera 50 to provide the near view 56 so that the display 24 displays the immediately adjacent 6 to 10 feet rearward of the vehicle. Utilizing the user input control 78, the driver can override these options and cause the camera to switch to any of the three views 54, 56, 58. Using these controls 78, the driver can cause the positioning circuitry 92 to drive the motor 52 to move the camera 50 to provide a view of the rear seat 63 and/or 62 on the display 24. This is useful for monitoring children and/or pets in the rear seats 62,63. When the DVD or video games are switched on, the positioning circuitry 92 automatically moves the display 24 to the second position 24a, unless this is overridden either manually by user input controls 78 or by the gear input 90 indicating the vehicle 22 is in reverse. The positioning circuitry also monitors whether a key is in the ignition of the vehicle 22. If there is no key in the ignition, the positioning circuitry 92 automatically moves the display 24 to the stored position in the tunnel 36 of the housing 34.

Using the user input control 78, the driver or front seat passenger can also cause the motor 96 to drive the cable 106 to move the display rearward along rail 26 to the second position, indicated as display 24a. In the second position, the door 42 is opened, either electrically or by the movement of the display 24a. The video switcher 84 sends a video signal from one of the entertainment components, such as the movie player 70, auto PC/MMS 86, TV tuner/antenna 88, video game 89 or from the auxiliary inputs in 74, or cameras 50 as determined by the input control 78 or 80, or a user-defined default or initial selection. If, while entertainment is being viewed in the display 24a while in the second position, the driver shifts the vehicle 22 into reverse, a pause signal is sent to the appropriate component (such as the movie player 70 or video game 89) and the motor 96 drives the display 24 to the first position. Simultaneously, the motor 52 drives the camera 50 to the adjacent view 56 and the video switcher 84 sends the camera image to the display 24. After the vehicle 22 is shifted out of reverse for a predetermined time the display 24 returns to the second position and resumes playing the entertainment. In the first position, the display 24 can also provide other information to the driver, such as navigation information or information about the vehicle 22.

Preferably, the front speakers 64 in the vehicle 22 operate to provide information to the driver (such as turn-by-turn navigation instructions) when the display 24 is in the first position. Preferably, the rear speakers 66 provide audio corresponding to the entertainment provided on the display 24 when the display 24 is in the second position. The speakers 64 and/or 66 may be replaced and/or complemented by headphones or wireless headphones. A center channel speaker may also be provided in the headliner adjacent the display or the vehicle console, particularly for movie soundtracks.

When the display 24 is in the first position, and receiving an input from the camera 50, the driver can cause the image processor 94 to process the image from the camera 50 to increase or decrease contrast, increase or decrease brightness, or provide image enhancement. The image processor 94 can amplify the signal and adjust the contrast and provide gamma correction. Preferably, the image processor 94 also provides contrast enhancement and edge detection to assist with night driving. In the embodiment shown in FIG. 1, the image processor 94 also flips the image horizontally (left/right) to simulate a mirror image to which the driver is accustomed to viewing when the camera 50 is providing a distant or near rear view 54, 56. The image processor 94 also automatically flips the image vertically (up/down) when the camera 50 is moved to the interior view 58.

FIG. 6 illustrates an alternative rail 118 which can be utilized to provide the display 24 in a first position and the display 24d in a second position. In this embodiment, the rail 118 includes a forward end 120 with a downwardly turned portion generally identical to that shown in FIG. 3. However, rather than proceeding straight rearward, the rail curves toward one lateral side of the vehicle 22 to a second end 122 of the rail 118 at which is a second downward turned portion. In the movement between the first end 120 and the second end 122, the display 24 is flipped vertically, which can be compensated by electronically flipping the image.

An alternate camera system 128 is shown in FIG. 7 in which the camera 50 is fixedly mounted to the headliner 28 and directed forwardly in the vehicle 22 toward a mirror 130 pivotally moved by a motor 132. In this embodiment, only a small mirror 130 need be moved by the motor 132, thus simplifying the design and permitting the use of a smaller motor 132. Further, the image need not be electronically flipped horizontally in order to provide an image similar to a normal rearview mirror, as is necessary for the design illustrated in FIG. 1. The mirror 130 is selectively pivoted by the motor 132 to provide the camera 50 with the different rearward views described above. An alternate camera system (not shown) could utilize a movable prism instead of the mirror 130.

Figure 8:
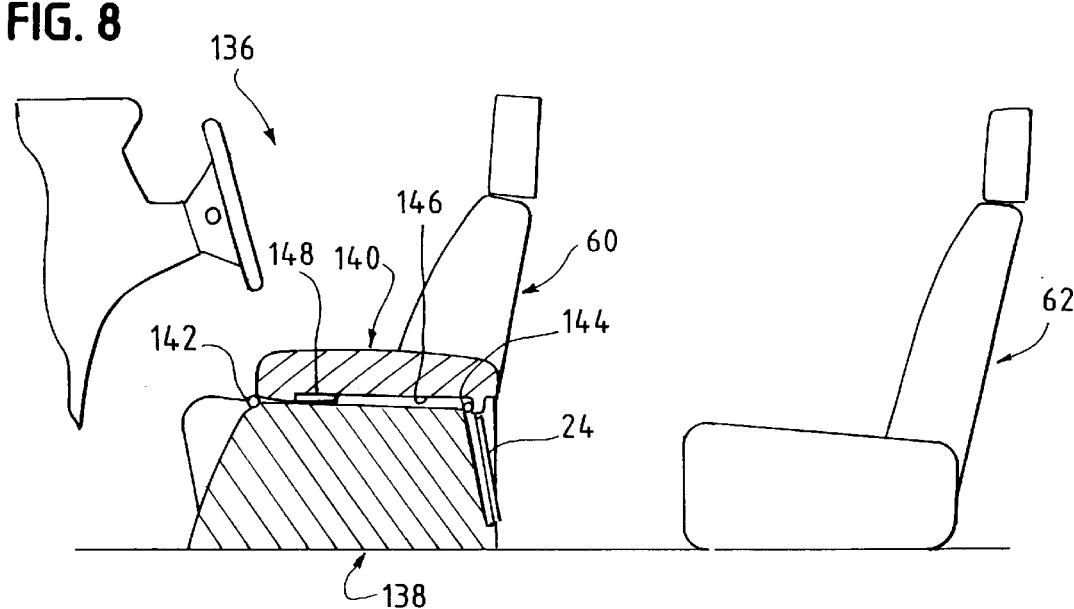
FIG. 8 illustrates an alternate vehicle display system showing the display in a first position.
Figure 9:
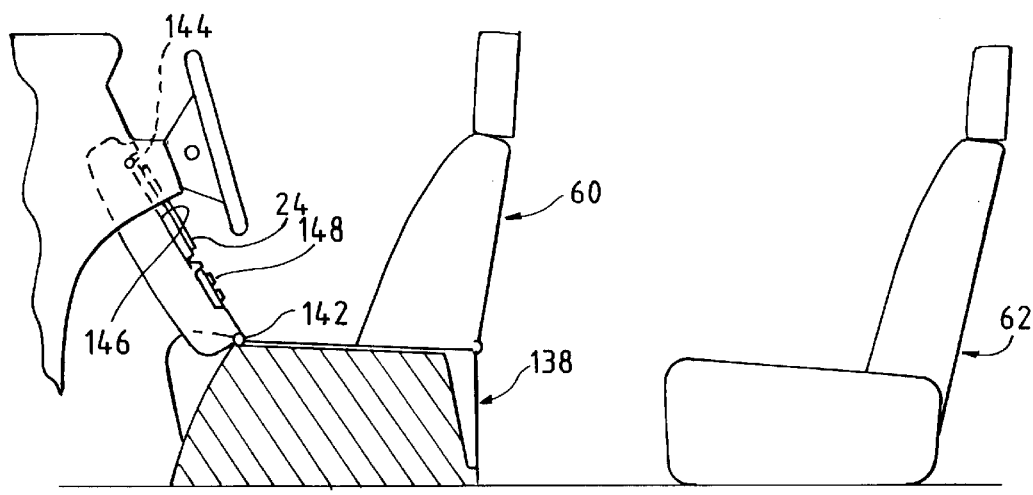
FIG. 9 illustrates the vehicle display system of FIG. 8 in a second position.

An alternate display system 136 is shown in FIG. 8 installed in the vehicle 22 having a driver seat 60 adjacent a center console 138 and in front of a rear seat 62. The center console 138 includes an armrest/cover 140 which is mounted by hinge 142 to the console 138 at a forward end. The cover 140 is also hingably mounted to the display 24 by a hinge 144 at the rearward end. As shown, the cover 142 includes a recess 146 adjacent the hinge 144 for accommodating the display 24. The cover 140 further includes input controls 148 adjacent the recess 146. As can be seen in FIG. 8, when the cover 140 is in the closed position on the console 138, the display 24 can hang downward and rest against the center console 138 in which position it is viewable by the passengers in the rear seat 62, but not to the driver in the driver's seat 60. Upon opening the cover 140 by hingably moving the cover at hinge 142, to the open position shown in FIG. 9, the display 24 hinges downward on cover 140 and is disposed in recess 146 where it is visible to the driver in the driver's seat 60. At this time, the driver also has access to the input controls 148 on the cover.

Figure 10:
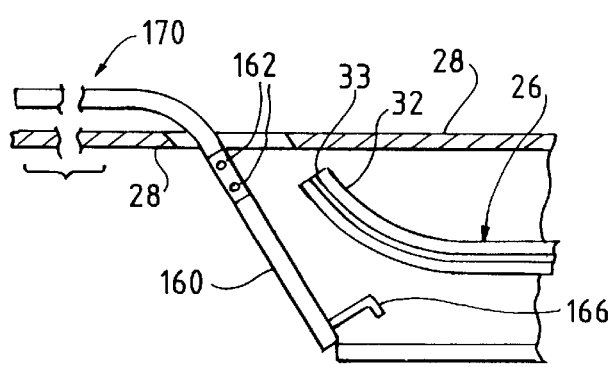
FIG. 10 illustrates an alternate door system for the tunnel of FIG. 1.
Figure 11:
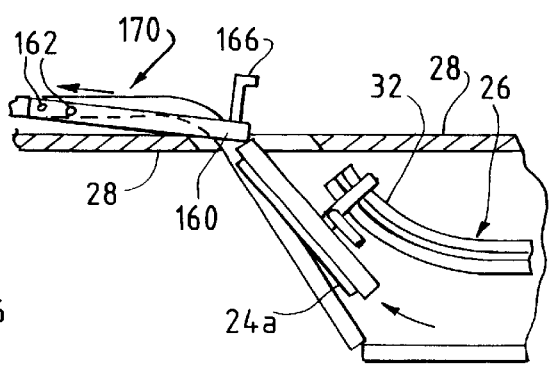
FIG. 11 illustrates the door system of FIG. 10 in an open position.

FIG. 10 illustrates an alternate sliding door 160 for covering the second opening 40 of the housing 34. The sliding door 160 includes guides 162, such as wheels, mounted on rails (not shown). The door 160 includes an inwardly extending projection 166. As can be seen in FIG. 11, when the display 24 moves to the second position 24a, the display 24 (or its bracket or some movable part of the display mechanism) contacts the projection 166 and pushes the door 160 upward through an opening in the headliner 28 into a recess 170. The door 160 slides along the rails.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle display system comprising:
   a display selectively movable between a first position viewable from a driver position and a second position viewable from a rear passenger position and not viewable from the driver position, said second position being positioned rearwardly of said first position and rearwardly of the driver position:
   a rearview camera selectively supplying a rearview video signal to said display when said display is in said first position, the rearview video signal selectively providing one of at least three views at different angles relative to the vehicle, wherein the views include a distant rearview, an adjacent rear view and an interior view of an interior portion of the vehicle; and
   a switch selectively sending the rearview video signal to said display when said display is in said first position and an entertainment video signal to said display when said display is in said second position.

2. A vehicle display system comprising:
   a display for selectively generating and displaying on a screen visual images represented by plural electrical video signals provided to said display, said video signals including a first video signal from a first source including at least one camera representing a view outside the vehicle and a second video signal from a second source having entertainment content; and a device for moving said display between a first position, wherein said screen is viewable from a driver position, and a second position, wherein said screen is viewable from a passenger position and is not viewable from the driver position, based upon the source of the video signal.

3. The vehicle display system of claim 2 further including a rail between said first position and said second position, said display being mounted on said rail to move between said first position and said second position.

4. The vehicle display system of claim 3 wherein said rail includes a downwardly extending portion adjacent said first position.

5. The vehicle display system of claim 4 wherein said rail includes an upwardly extending portion adjacent said second position.

6. The vehicle display system of claim 5 wherein said display in said first position is generally parallel to said display in said second position.

7. The vehicle display system of claim 3 wherein said display in said first position is generally perpendicular to said display in said second position.

8. The vehicle display system of claim 3 wherein said display in said first position is at a predetermined angle relative to said display in said second position.

9. The vehicle display system of claim 3 further including a housing at least partially enclosing said rail and said display between said first position and said second position.

10. The vehicle display system of claim 9 wherein said housing further includes a first opening adjacent the first position and a second opening adjacent the second position, the housing further including a door at least partially covering one of said first and second openings.

11. The vehicle display system of claim 10 wherein said door is spring-biased to a closed position over the second opening.

12. The vehicle display system of claim 10 wherein said housing comprises a duct for supplying cooled air therethrough.

13. The vehicle display system of claim 2 further including an arm pivotally mounted at a first end and mounted to the display at a second end, said arm movable about said first end to move said display from said first position to said second position.

14. The vehicle display system of claim 13 further including a console, said arm pivotally mounted at said first end to said console.

15. The vehicle display system of claim 14 wherein said arm comprises a cover to said console.

16. The vehicle display system of claim 2 further comprising:

a rearview camera for generating said first video signal representing a view rearwardly of said vehicle for a driver of said vehicle; and a second video source for generating said second video signal to display said entertainment content for an occupant of said vehicle.

17. The vehicle display system of claim 16 further comprising a motor for moving said rearview camera to provide different views rearwardly of said vehicle.

18. The vehicle display system of claim 17 wherein said motor can move said rearview camera relative to said vehicle to provide an interior view of a rear seating area of said vehicle.

19. The vehicle display system of claim 18 further comprising an image processor for selectively applying to said first video signal at least one of brightness adjustment, contrast/enhancement adjustment and gamma correction.

20. The vehicle display system of claim 19 wherein said different views rearwardly of said vehicle include a distant rearview and an adjacent rearview.

21. The vehicle display system of claim 16 wherein said second position is positioned rearwardly of said first position and rearwardly of the driver position.

22. The vehicle display system of claim 21 further including a switch for selectively sending said first video signal to said display when said display is in said first position and sending said second video signal to said display when said display is in said second position.

23. The vehicle display system of claim 22 wherein said second video source comprises one or more devices selected from the group comprising an auto PC, a TV tuner, a video game and a movie player selected from the group including a video tape player and a digital video disc player.

24. The vehicle display system of claim 16 further comprising at least one of a front view camera and a side view camera for generating front view and side view video signals respectively for selective viewing on said display.

25. The vehicle display system of claim 2 wherein said display has a flat panel screen selected from the group comprising an electroluminescent display, a liquid crystal display, an organic light emitting device and a ferroelectric liquid crystal display.

26. A method for displaying an image in a vehicle including the steps of:

moving a display to a first position in a vehicle;

providing a first video signal to the display when the display is in the first position;

moving the display to a second position in the vehicle;

providing a second video signal to the display when the display is in the second position; and monitoring a signal from a video source of the second video signal and moving the display to the second position based upon the signal from the video source.

27. The method of claim 26 wherein the first position is forward of a driver's seat in the vehicle and the second position is rearward of the first position.

28. The method of claim 27 wherein the second position is rearward of the driver's seat.

29. The method of claim 26 further including the step of reading the second video signal from a removable media in step d).

30. The method of claim 26 further including the step of sending the first video signal from a rearview camera.

31. The method of claim 30 further including the steps of:

e) providing a distant rearview as the first video signal in step b); and f) providing a near rearview as the first video signal in step b).

32. The method of claim 31 further including the step of:

g) monitoring whether the vehicle is in a reverse gear and selecting between said steps e) and f) based upon said step g).

33. The method of claim 31 further including the step of:

g) providing an interior rearview as the first video signal in step b).

34. The method of claim 33 further including the step of:
h) selecting from among the distant rearview, the near rearview and the interior rearview prior to said step b).

35. The method of claim 26 further including the step of:
monitoring whether the vehicle is in a reverse gear and selecting between providing the first or second video signals based upon said monitoring.

36. The method of claim 26 further including the step of:
monitoring an ignition signal of the vehicle and moving the display to the second position based upon the ignition signal.

* * * * *